United States Patent
Donner et al.

(10) Patent No.: US 8,780,706 B1
(45) Date of Patent: Jul. 15, 2014

(54) CONTROLLED DISTRIBUTION OF PHASOR MEASUREMENT DATA USING MULTICAST ROUTING

(75) Inventors: Paul Donner, Albuquerque, NM (US); Navindra Yadav, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 13/343,117

(22) Filed: Jan. 4, 2012

(51) Int. Cl.
*H04L 1/00* (2006.01)
*H04L 12/26* (2006.01)

(52) U.S. Cl.
USPC .......................... 370/229; 370/230; 370/231

(58) Field of Classification Search
CPC ....... Y04S 10/265; Y04S 10/26; Y04S 10/10; Y02E 60/72; Y02E 60/728; Y02E 60/70
USPC .......... 370/229, 230, 231, 235, 351, 389, 390
See application file for complete search history.

(56) References Cited

U.S. PATENT DOCUMENTS

2005/0114656 A1* 5/2005 Liu et al. ...................... 713/163

OTHER PUBLICATIONS

Myrda, "NASPInet Demo", Feb. 24, 2010, NASPI North American SynchroPhasor Initiative, all pages.*
Taft et al, "Recommended Approach to a NASPInet Architecture", Jan. 4, 2012, 2012 45th Hawaii International Conference on System Science (HCSS), all pages.*
Yadav, "NASPInet Architectural Issues", Oct. 5, 2010, NASPI DNMTT, all pages.*
Bobba, "Secure Delivery fo Time-Critical Data on NASPInet: Requirement and Challenges", May 26, 2010, all pages.*
Novosel, et al., "Dawn of the Grid Synchronization," IEEE Power & Energy Magazine, 2008.
Huang, et al., "Performance Evaluation of Phasor Measurement Systems," IEEE Power Engineering Society General Meeting, Pittsburgh, PA, 2008.
NERC, "Real-Time Application of Synchrophasors for Improving Reliability," Princeton, NJ, Dec. 18, 2010.

* cited by examiner

*Primary Examiner* — Kwang B Yao
*Assistant Examiner* — Adam Duda
(74) *Attorney, Agent, or Firm* — Edell, Shapiro & Finnan, LLC

(57) ABSTRACT

A network device sends into a network a request to be connected to a particular multicast source-group pair for a Phasor Measurement Unit (PMU) data stream comprising packets containing phasor measurement data. The network device receives the phasor measurement data stream for the particular multicast source-group pair. The source-group pair information is compared against stored data specifying handling rules for packets associated with phasor measurement data streams. The packets in the received phasor measurement data stream are modified when there are handling rules in the stored data for the particular multicast source-group pair of the received phasor measurement data stream. The packets (now modified) for the phasor measurement data stream for the particular multicast source-group pair are re-originated with a new multicast source-group pair and sent into the network. In order to support existing legacy PMU devices, IP unicast-to-multicast conversion is implemented.

18 Claims, 7 Drawing Sheets

CONTROLLED DISTRIBUTION OF PHASOR MEASUREMENT DATA USING MULTICAST ROUTING

TECHNICAL FIELD

The present disclosure relates to distributing phasor measurement data.

BACKGROUND

Originators of phasor measurement data such as Phasor Measurement Units (PMUs) and Phasor Data Concentrators (PDCs) and receivers of phasor measurement data, currently utilize IP unicast to transmit PMU data throughout a Power Utility network. The majority of PMUs and PDCs implement Internet Protocol (IP) unicasting because of the volume of legacy equipment. Unicast networking techniques are not the most efficient manner to distribute phasor measurement data.

DESCRIPTION OF EXAMPLE EMBODIMENTS

Overview

Figure 1:
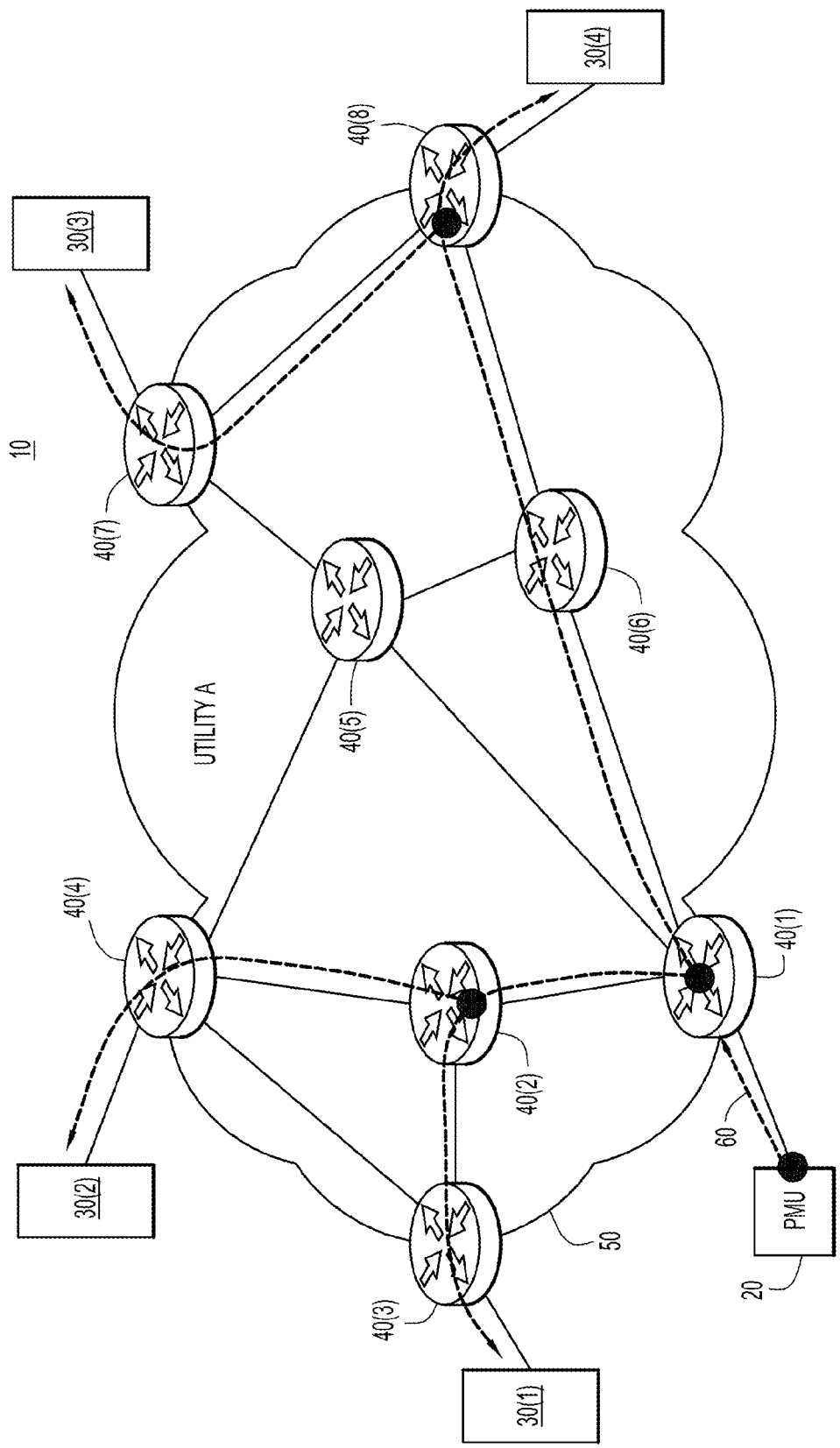
FIG. 1 is a block diagram illustrating an example of a network environment in which a router is configured to convert unicast packets carrying phasor measurement data to multicast packets.

More intelligent and efficient distribution of phasor measurement data is achieved using multicast networking techniques. A network device sends into a network a request to be connected to a particular multicast source-group pair for a phasor measurement data stream comprising packets containing phasor measurement data. The network device receives the phasor measurement data stream for the particular multicast source-group pair. The source-group pair information is compared against stored data specifying handling rules for packets associated with phasor measurement data streams. The packets in the received phasor measurement data stream are modified when there are handling rules in the stored data for the particular multicast source-group pair of the received phasor measurement data stream. The packets (now modified) for the phasor measurement data stream for the particular multicast source-group pair are re-originated with a new multicast source-group pair and sent into the network.

Example Embodiments

Described herein are techniques that use Internet Protocol (IP) Multicast technology for the transport of Phasor Measurement Unit (PMU) measurement data within a single network domain or between network domains. Each component of a Power Utility's PMU service architecture (i.e., Phasor Data Concentrators, Historians, Supervisory Control and Data Acquisition, etc.) function optimally (without changing the traditional role of the service component) by focusing primarily on the transfer of PMU information within a scalable and dynamic network architecture. These service components are not involved in the receipt and re-transfer of PMU data as network elements in the path of the network data. The term "Utility" refers to a power utility distribution entity or service provider. In this architecture each of the service components acts as a "host" which receives the data, from relevant PMUs, at the edge of the network. In this way the network provides the network transport for PMU data and utilizes standardized, existing and deployed technologies to accomplish this.

PMUs typically conduct measurements of the target subject (equipment at a power substation) and package the measurements into one of various formats such as the Generic Object Oriented Substation Event (GOOSE) format; Sampled Value (SV); the Institute of Electronics and Electrical Engineers (IEEE) C37.118-2005 standard; and the International Electrotechnical Commission's (IEC) 61850-90-5 standard.

While there is discussion about the use of the Internet Protocol (IP) within various protocol documents related to GOOSE and SV messages, these messages are typically encapsulated directly into Ethernet frames (without IP). Use of Ethernet framing without IP geographically restricts the scope for the transfer of data. Adequate transport of GOOSE and SV messages across the WAN requires use of an end-end transport protocol. On the other hand, both C37.118-2005 and IEC 61850-90-5 specify the use of the IP protocol transport (either IP Multicast or Unicast).

The IP transport layer protocol most widely used is the Universal Datagram Protocol (UDP). However, some implementations utilize the Transport Control Protocol (TCP) for PMU control/configuration and/or data transfer or even a combination of both UDP and TCP across control and data planes for the same PMU or set of PMUs. GOOSE and SV messages typically remain within the confines of the local area network where they originate or are transferred by collector service applications using a backhaul process after being locally consumed. Virtual local area network framed messages are also used but still suffer from various limitations when implemented in wide area network environments.

PDCs receive PMU messages and "concentrate" or combine them into a unified output "stream" and time-synchronize the messages for temporal relevance by correlating their time-stamps, originally instantiated at the PMU, against each other. The PDC may then output this combined message stream to another PDC (referred to as "PDC stacking", when PMU messages traverse multiple "daisy-chained" PDCs on their journey to the Operations Center). Eventually the PMU messages arrive at the Operations Center.

Along the path from PMU to the Operations Center, various actions (e.g., local protection, tele-protection) can be taken at intermediate points (e.g., Substations which might be along the network path) based on an evaluation of the PMU measurements or their comparison to PMU measurements from other parts of the Utility or from other Utilities. In addition, PMU measurement data may also travel external to the local utility, for example, to a regional entity such as an Independent System Operator (ISO)/(RSO).

This dependence on PDC "forwarding" (or in the case of alternate proposed middleware solutions, a middleware entity which "forwards" the PMU measurements) introduces a number of negative effects which can have an impact on delay, jitter, scalability of the system, availability of the system and others. One of the goals of the architecture and methods described herein is to remove PDCs and other non-networking entities from the network path between the PMU and any PMU message-consuming entity (be they PDCs, Historians, Middleware components or other entities). This simplification will have a significantly positive impact on how the network performs, reduce the complexity of management of the network and help it to scale as the PMU network grows in size and sophistication.

This architecture described herein involves the conversion of IP unicast packets to IP multicast packets on a one-to-one basis by converting the Unicast IP destination address to a Multicast IP destination group address. These techniques also involve an option to convert the OSI Layer 4 destination port numbers as well as to compute a UDP checksum. In addition, the PMU streams may be replicated and/or modified using different packet transformation operations on the individual copies of the replicated PMU data streams depending on the ultimate destination of the PMU data stream.

Reference is made to FIG. 1. FIG. 1 shows an example network 10 in which there is a PMU 20 and multiple PMU data consumers (of any of the aforementioned or other types) shown at reference numerals 30(1)-30(4). There may be more or less than four PMU data consumers; this is only an example. There are numerous network routers 40(1)-40(8) in this example within a network domain 50 of a given power utility, referred to Utility A. Router 40(1) is a first-hop router (FHR) with respect to the PMU data from the PMU 20. Routers 40(3), 40(4), 40(7) and 40(8) are last hop routers (LHRs) with respect to PMU data consumers. Routers 40(2), 40(5) and 40(6) are intermediate routers in this example.

The IP Multicast architecture assumes that the PMU is a multicast source. As such, the PMU 20, once it has been activated for message transmission, will put out a continuous stream of packets toward its respective FHR (e.g., one or more FHRs—the total number of which is essentially unbounded). Current PMUs transmit using IP Unicast. Conversion (external to the PMU itself) from Unicast to Multicast can be implemented at any designated routing element (e.g., FHR or beyond) to accommodate legacy PMUs which cannot transmit using IP Multicast.

The PMU messages, shown at reference numeral 60, are transmitted to the FHR 40(1) (or gateway) on the local network 50 to which the PMU 20 is connected. The FHR 40(1) is the first node in a multicast "tree" from the source (the PMU 20) to the destination (i.e., a device such as a PDC or other application service component located at an intermediate point in the network, at an Operations Center or in another network domain). Again, examples of destinations are shown at reference numerals 30(1)-30(4). Once the PMU 20 has been sent a message to begin transmitting, it will transmit to the FHR 40(1) regardless of whether there are active receiving hosts. If there are no active receivers on-line to receive the PMU data packet stream, the FHR 40(1) will discard (not forward) the PMU packets until such time as receivers become active.

All of the destinations to which the PMU 20 will be transmitting are hosts (referred to as application service components) located at the edge of the network rather than being located "inside" the network and part of the forwarding path. Examples of these hosts are PMU data consumer 30(1) and PMU data consumer 30(2). These hosts are not participating in the forwarding of the messages from the PMU 20. These "hosts" are called "Receivers" in IP Multicast terminology.

IP Multicasting

In order for PMU messages to be forwarded from the FHR 40(1) to the destinations, one or more destinations or "Receivers" need to be "active" within the multicast implementation. In order to become "active" a Receiver signals to the network that it wishes to receive traffic from a specific multicast source. This source is specified using what is called an (S,G) pair, where "S" represents the IP Unicast address of the source (i.e., the PMU 40(1)) and "G" represents the multicast Group address (value in the Layer 3 Destination address field of an IP packet) which associates to the set of Receivers who will receive traffic from the specific source. The Group address is also referred to as a Multicast address (part of the Internet Class E address space). The Group address is used in the multicast routing table to show the downstream (i.e., towards the Receivers) egress ports on a router from which the specific multicast traffic is to be transmitted in order to reach one or more Receivers of specific (S,G) associated traffic. The source PMU (i.e., multicast source) 20 transmits each IP packet, containing a PMU message, using the Group address G, in the IP destination address field and the Source address, S, in the IP source address field.

Becoming a Receiver

Figure 2:
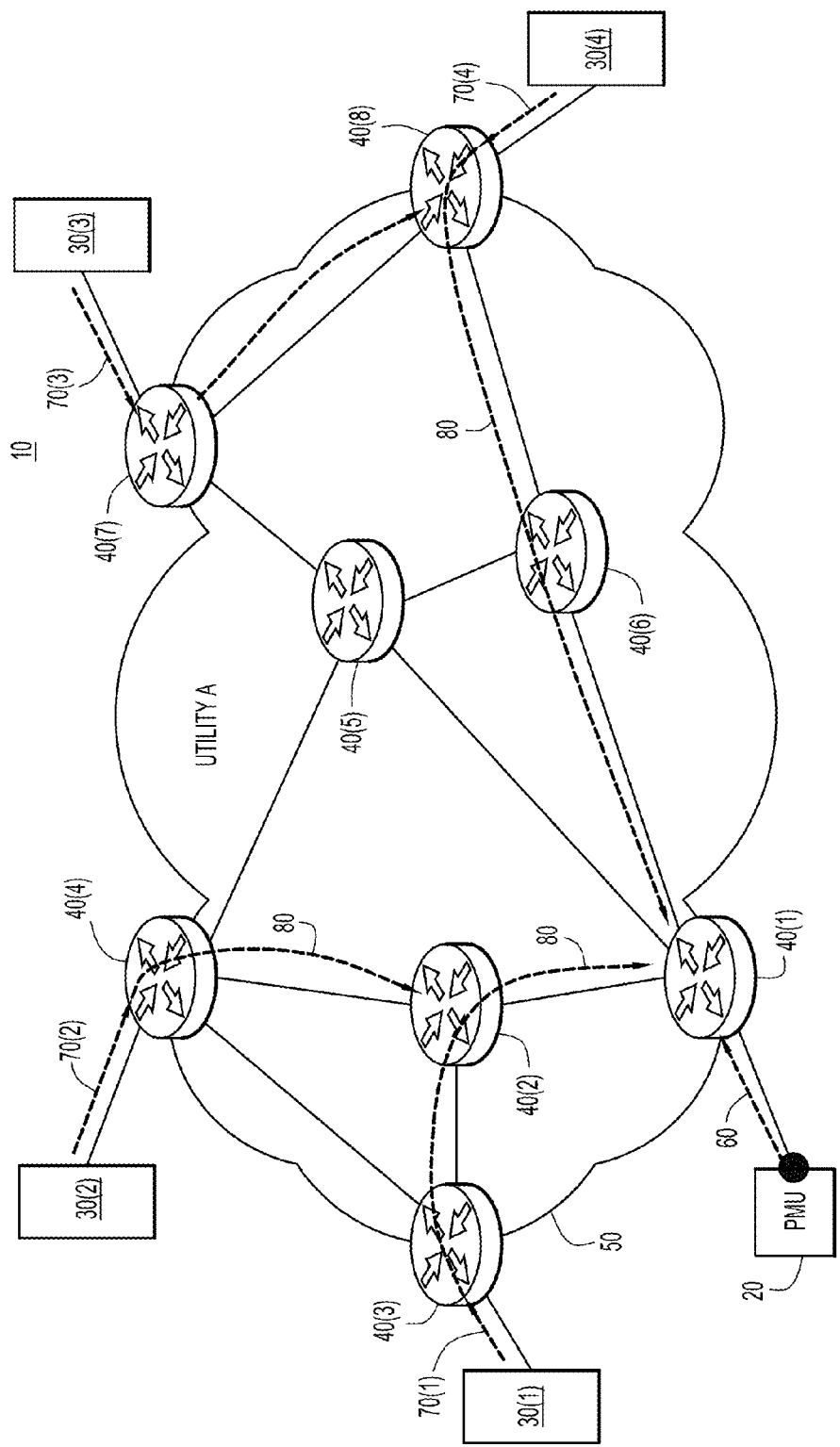
FIG. 2 is a block diagram similar to FIG. 1 and showing signaling to initiate access to a multicast stream of packets.

Reference is now made to FIG. 2. A Receiver (e.g., a PDC, a Historian or other application service component) that wishes to receive traffic from a specific source PMU, e.g., PMU 20, utilizes a protocol called Internet Group Management Protocol (IGMP), Version 3. Version 3 supports the Multicast model called Protocol Independent Multicast-Source Specific Multicast (PIM-SSM). The Receiver sends a message, e.g., an IGMPv3 message 70, to its local gateway router (the gateway is also referred to as the LHR in this case) that it wishes to receive traffic from the specific source, $S_a$, for PMU 20. For example, the PMU data consumer 30(1) sends an IGMPv3 request message 70(1) to router 40(3), PMU data consumer 30(2) sends an IGMPv3 request message 70(2) to router 40(4), PMU data consumer 30(3) sends IGMPv3 request message 70(3) to router 40(7) and PMU data consumer 30(4) sends IGMPv3 request message 70(4) to router 40(8). The IGMPv3 request messages also specify the Group address to which it belongs, Ga. This information, the (S,G) pair, will need to be known in advance to the Receiver. How this information can be made available or published to potential receivers is described hereinafter.

Once the potential Receiver notifies the LHR that it wishes to become a Receiver of traffic from source $S_a$, the LHR begins a process of multicast protocol signaling, by IP Multicast Protocol Join Requests shown at 80, that travel in the upstream direction (US) towards the source PMU 20. The US path is determined by the unicast route to the unicast source address Sa of the PMU 20. If this is the first Receiver in the multicast group, Ga, the signaling will travel all the way back to the PMU source's FHR 40(1). As the signaling travels in the US direction toward the PMU source 20, the multicast process will be building a downstream (DS) path/route to the Receiver instantiating both the group address, $G_a$, and the source address $S_a$ into the IP multicast routing table in each router along the path. If this is not the first Receiver to join the specific group, the multicast signaling will travel back toward the PMU source until it arrives at a router whereby it can "Join" an existing multicast "Tree" that is already transmitting data from the specific PMU source $S_a$, towards, $G_a$. From the source to the receivers for a particular (S,G) pair, the path structure looks like a "Tree" with branches pointing out to the various receivers which lie at the ends of the branches.

A benefit of IP Multicast is that it does not implement multiple copies of the same data stream from the source PMU 20. It implements a single stream in the form of a "Tree" (an upside-down tree in the S to G direction) which branches off at particular points in the network in order to efficiently reach all active receiver/members of the particular multicast group. A router where a Tree branches off, replicates the multicast packets out each interface required (are part of the branching) in the downstream direction.

Once the tree is built from the FHR to relevant LHRs, multicast traffic can begin to be forwarded to the Receiver(s). Receivers can join and disconnect from the Tree at any time. At the LHR, the traffic is forwarded onto the local area network to which the receiver is attached. Most Receivers and sources will be connected to the LHR and FHRs via Ethernet local area networks (LANs). The Ethernet frames in which the IP multicast traffic is encapsulated implement an Ethernet multicast address. This will signal to the local LAN computers that this is a multicast packet. The Ethernet multicast address is derived from the IP multicast Group address. Receivers will know which Ethernet multicast address to look for that corresponds with the Group address specified in the (S,G) pair or pairs they are working with.

In order to integrate an application service component (e.g., PDC, Historian or other) with this PMU architecture, IGMPv3 support is integrated within the Operating System (OS) of the receiving device platform. This can be as simple as modifying an application to make a call (in order to convey the [S,G] pair to the IGMPv3 process) to a standard OS IGMPv3 routine in order to establish the platform/application as an IP multicast receiver.

As PMU data becomes more important to the daily operations of the power utilities (e.g., for distributed protection and other purposes), PMUs will likely proliferate in number as well as geographic location. Consumption of the data from PMUs is also likely to expand resulting in the need to deliver PMU data to many locations within the same network domain and to other network domains (e.g., other Utilities as well as Independent Service Operators/Regional Service Operators and other entities). As PMU networks grow in size and complexity, the need to scale the delivery of PMU data as well as the reliability of this delivery will increase dramatically.

While future designs of PMUs may include native multicast capabilities, there are a significant number of deployments that use legacy PMU equipment that do not presently have native multicast capabilities. To this end, routers are configured to support unicast-to-multicast conversion of PMU data packets, allowing legacy PMU equipment to operate normally using their legacy unicast capabilities.

Routers that are configured with the unicast-to-multicast conversion capabilities described herein convert IP unicast packets to IP multicast packets on a one-to-one basis by converting the unicast IP destination address to a Multicast IP destination group address. In addition, the Layer 4 destination port numbers in the IP packets may be converted and a UDP checksum may be computed as well. Further still, techniques are described herein to replicate PMU streams and perform different packet transformation on individual copies of the replicated PMU data streams.

Figure 3:
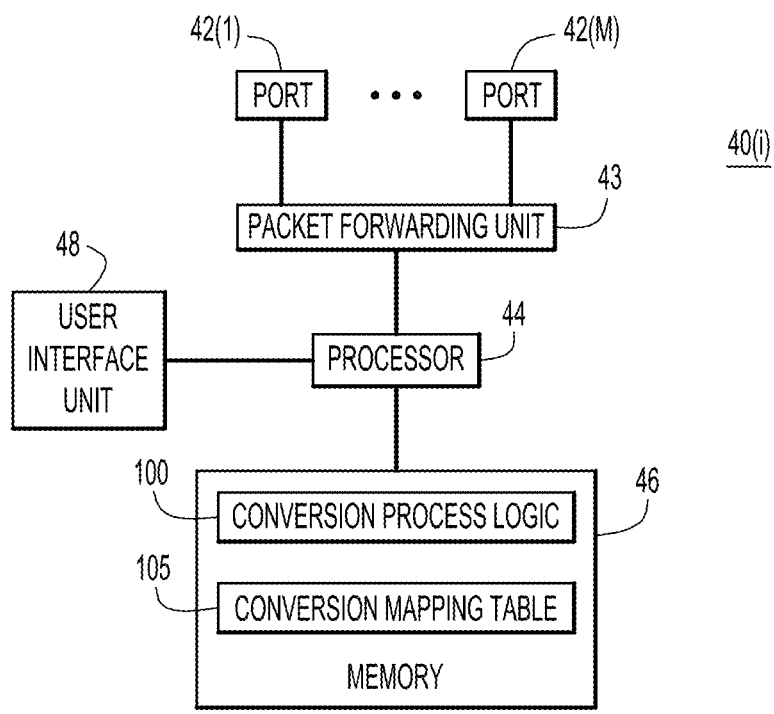
FIG. 3 is an example of a block diagram of a network device, e.g., a router, configured to perform the packet routing techniques for phasor measurement packets.

Turning now to FIG. 3, an example block diagram is shown of a router configured to perform the unicast-to-multicast conversion and other functions described herein. The router shown in FIG. 3 is representative of any of the routers 40(1)-40(8) shown in FIGS. 1 and 2, and in particular the FHR router associated with any PMU data source, e.g., PMU 20. In general, any network device with packet forwarding capabilities can be configured to perform the operations described herein. The router, shown generically by reference numeral 40(i), comprises a plurality of ports 42(1)-42(M), a packet forwarding unit 43, a processor 44, memory 46 and a user interface unit 48. The ports 42(1)-42(M) are configured to receive packets from or send packets to a network. The packet forwarding unit 43 is, for example, one or more application specific integrated circuits that includes buffers, queues, and other control logic for performing packet forwarding operations. The processor 44 is a microcontroller or microprocessor that is configured to perform higher level controls of the router. To this end, the memory 46 stores software instructions that, when executed by the processor 44, cause the processor 44 to perform a variety of operations including operations described herein. For example, the memory 46 stores instructions for conversion process logic 100 and data for a conversion mapping table 105.

The conversion process logic 100 enables the processor 44 to perform the unicast-to-multicast conversion operations, and to perform PMU packet masking/modifying operations described herein.

The conversion mapping table 105 stores data used to identify specific incoming packets and to replace specific IP and UDP field values prior to forwarding the packet out of the router. Any packets modified, as described herein, are forwarded based on the multicast table that exists within the router at the time of forwarding. As such it is assumed that the requisite multicast control plane signaling has already taken place as normal and that the necessary multicast table entries have been instantiated into the multicast routing information base (RIB).

Memory 46 may comprise read only memory (ROM), random access memory (RAM), magnetic disk storage media devices, optical storage media devices, flash memory devices, electrical, optical, or other physical/tangible memory storage devices. Thus, in general, the memory 46 may comprise one or more tangible (e.g., non-transitory) computer readable storage media (e.g., a memory device) encoded with software comprising computer executable instructions and when the software is executed (by the processor 44) it is operable to perform the operations described herein in connection with process logic 100.

The conversion mapping table 105 is created manually or automatically and instantiated in the converting router. For example, the values for the mapping table 105 may be input to the router via the user interface unit 48 that is configured to receive input commands and data from a user, e.g., command line interface, or another interface mechanism. For example, an external controller may push the configurations down into the mapping table. The memory 44 also stores data representing S,G pair information for a particular stream of traffic to be modified, and also data indicating the type of modification to be made to that stream depending on a privilege level set for a destination of that stream (which will be modified and re-originated). This data may be stored as part of the conversion mapping table 105 or separately therefrom in the memory 46.

The conversion mapping techniques are intended to support both Source Specific Multicast (SSM) and Any Source Multicast (ASM) schemes.

The conversion mapping table 105 contains, at a minimum, the following attributes:
IP Unicast Attributes (Source Packet Attributes):
Source IP Address
Source UDP Port Number
Destination IP Address
Destination UDP Port Number
Check UDP Checksum (YES or NO)
IP Multicast Attributes (Converted Packet Attributes):
Source IP Address Source UDP Port Number
Destination IP Address
Destination UDP Port Number
UDP Checksum Computation (YES or NO)

Identification of source-originated packets arriving at the converting router can be based on any combination of the source packet attributes instantiated in the mapping table. Conversion of the IP Unicast Destination address is completed by replacing the Unicast Destination IP Address with the Multicast Destination IP Address. Optionally, the IP Unicast Destination UDP Port number can be replaced with the IP Multicast UDP Port Number and UDP checksum.

Matching is based on all Source Packet Attributes which have been defined in the conversion router configuration and which are therefore instantiated in the mapping table 105. Not all attributes need be present in order to match incoming packets. Most-specific match (one which matches the most "available" Source Packet Attributes) takes priority in the event multiple possible matches occur. In the case of match ties (where the same number of IP Unicast Attributes match), the first match identified by the table may take priority, in one example.

The unicast-to-multicast conversion operations may be configured so as not to be tied to existing network address translation/packet address translation (NAT/PAT) implementations because these are associated with conversion interfaces. Thus, the unicast-to-multicast conversion operations may be independent of NAT-based interface conversion definitions which may be active in the router. Any traffic entering the conversion router from any interface and exiting on any interface should be able to be converted.

An FHR configured in the manner shown in FIG. 3 and described further hereinafter can ingest one or more PMU data IP/UDP unicast streams from one or more PMUs and convert each of these streams to multicast streams. The newly-converted unicast-to-multicast traffic can then be forwarded in the downstream direction once receivers have become active for the relevant (S,G) pairs.

PMUs today typically implement a set of management control and response commands as well as a PMU message transmission function. This allows a separation of control and data plane functions which can be beneficial for various reasons. An example of such control plane functions is described in the IEEE C37.118-2005 standard document, such as for CONFIGURATION I & II, COMMAND, and HEADER frames which contain commands and responses used in conversations between a server (i.e., PMU) and client (i.e., PMU consumer and possible PMU control entity). The data messages are referred to as DATA frames.

In the IP multicast architecture described herein, a separate, IP unicast-based control plane is useful because it provides for the ability to implement a control entity separate from the receiver/consumer and to implement separate security implementation for control and data functions. In addition, the separate control plane allows for implementation of a control entity within one network domain and receiver/consumer entity in a separate network domain (which may be useful in Utility-to-ISO PMU data sharing for example, without providing control of the PMU to the ISO or other "external" entity that desires to consume PMU data). Furthermore, these techniques allow for implementation of three distinct PMU-related entities including a Management entity, as well as the aforementioned consumer and server entities. The Management entity therefore does not need to be one and the same as the consumer entity.

Figure 4:
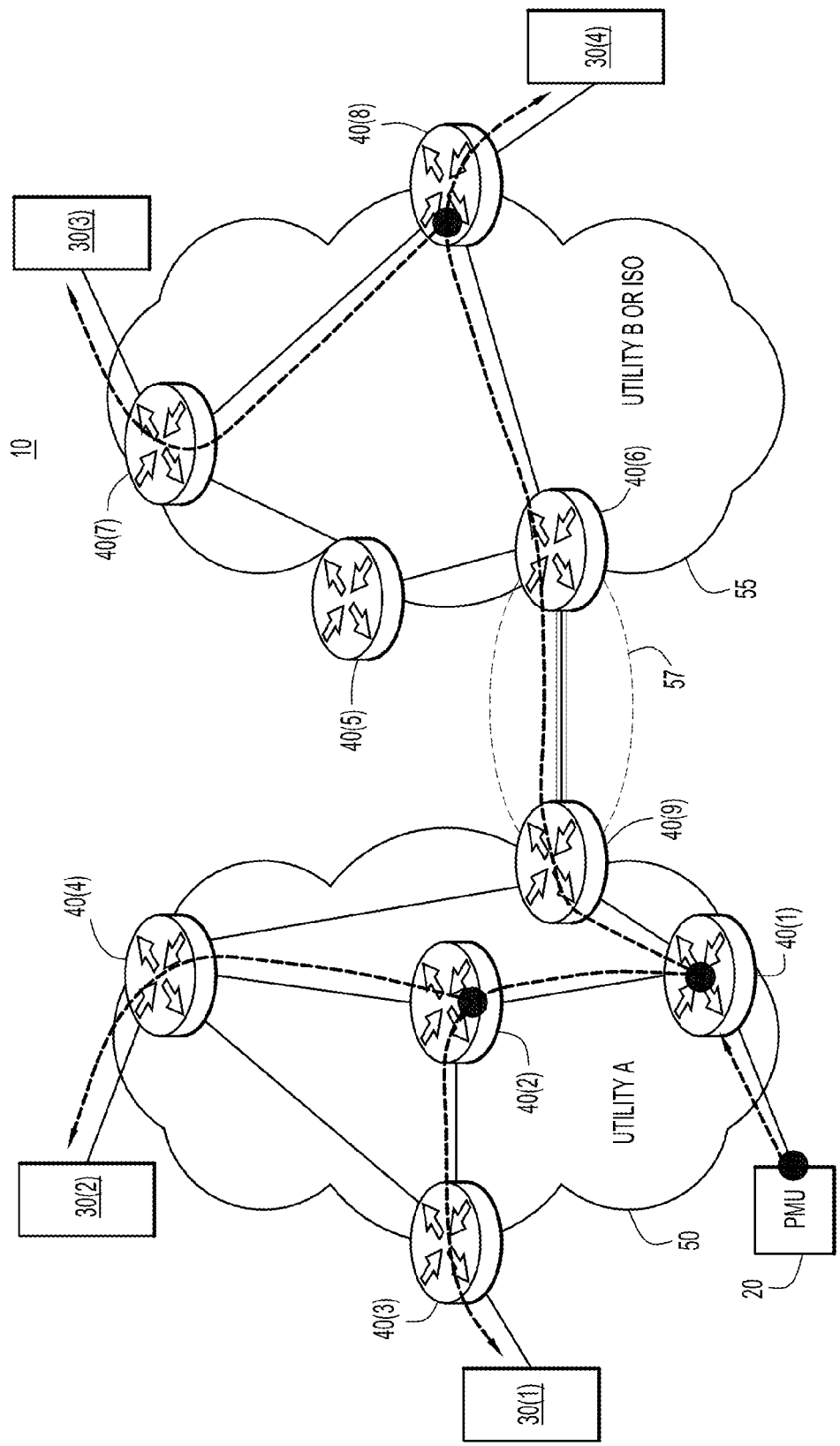
FIG. 4 is a diagram similar to FIGS. 1 and 2, and showing how the network device can use multicast techniques to share phasor measurement data packets across utility service network boundaries.

Reference is now made to FIG. 4. Often it is desirable to share PMU data between Utilities as well as between Utilities and ISOs/RSOs. In both cases, PMU data will traverse network domain boundaries. As a result, it is useful to integrate IP multicast information and signaling between domains. FIG. 4 shows an example in which there is a network 50 for Utility A and a network 55 for Utility B or an ISO. There is a inter-domain boundary 57 between networks 50 and 55. An additional router 40(9) is shown in FIG. 4 that operates at the edge of the network 50 at the inter-domain boundary 57 with network 55.

The use of PIM-SSM makes inter-domain multicast data transfer (and the relevant signaling and path/tree setup) much easier than the PIM-ASM scheme. SSM presents a marked improvement over ASM in that the Multicast Source Discovery Protocol (MSDP) is not necessary for inter-domain source discovery. An important issue here is the ability to easily implement inter-domain multicast integration at the network edge (in the gateway routers). As a result, the access by one Utility or ISO, for example, to a second Utility's shared PMU data can easily traverse the domain boundaries necessary for the data sharing to occur.

A Utility Service provider can retain management control over its PMUs (within its network domain) while still allowing another (secondary) Utility or ISO to obtain data from its PMUs. This is achieved through the IP multicast implementation. When a receiver, e.g., PMU data consumer 30(3) associated with network 55, signals its intent to receive data from a particular PMU, e.g., PMU 20, by specifying an S,G pair, multicast signaling will take place and establish the tree to enable the flow of data across network domain boundaries. Properly configured (e.g., by the Utility that manages the specific PMU), multiple domain boundary traversals may be achieved. An example of this is when two Utilities are sharing PMU data with each other across an intermediate North American Synchro-Phasor Initiative (NASPI) network (NAPSInet), e.g., an example of which is shown at 57. In this case there are two domain boundary traversals, between Utility A and the NASPInet, and the NASPInet and Utility B/ISO, assuming that a NASPInet "entity" is implemented to provide universal interconnect between Utilities and ISOs. This could also be done Utility-to-Utility without an intermediate network.

The Receiver is signaling back to the FHR, e.g., router 40(1) (which then signals back across one or more domain boundaries) that it wishes to receive data from a particular PMU. As long as the owning utility has configured the PMU for data transmission, inter-domain multicast is configured, and assuming that the Receiver has the appropriate access rights, the Receiver can begin receiving data from the PMU once the multicast path has been completely built. FIG. 4 shows this example where the PMU data consumers 30(3) and 30(4) that are connected to routers 40(7) and 40(8) of network 55, respectively, have requested PMU data generated by the PMU source 20 in network 50. FIG. 4 also shows that the PMU data consumers 30(1) and 30(2) that are connected to routers 40(3) and 40(4) in the network 50 also receive the PMU multicast stream.

In order for Receivers to be able to specify to the network which (S,G) pair they wish to receive data from, they need some contextual knowledge of how the (S,G) information relates to the data they want to receive. As one example, a PMU Registry is being developed and maintained by Grid Protection Alliance for TVA. This is one useful tool to provide such contextual relevance. As such, the PMU Registry could integrate the (S,G) multicast information for the particular PMU within the metadata related to the registered PMU. Potential Receivers of this data can reference/access the PMU Registry to obtain the necessary data for them to be able to establish themselves as a receiver of the PMU data.

Figure 5:
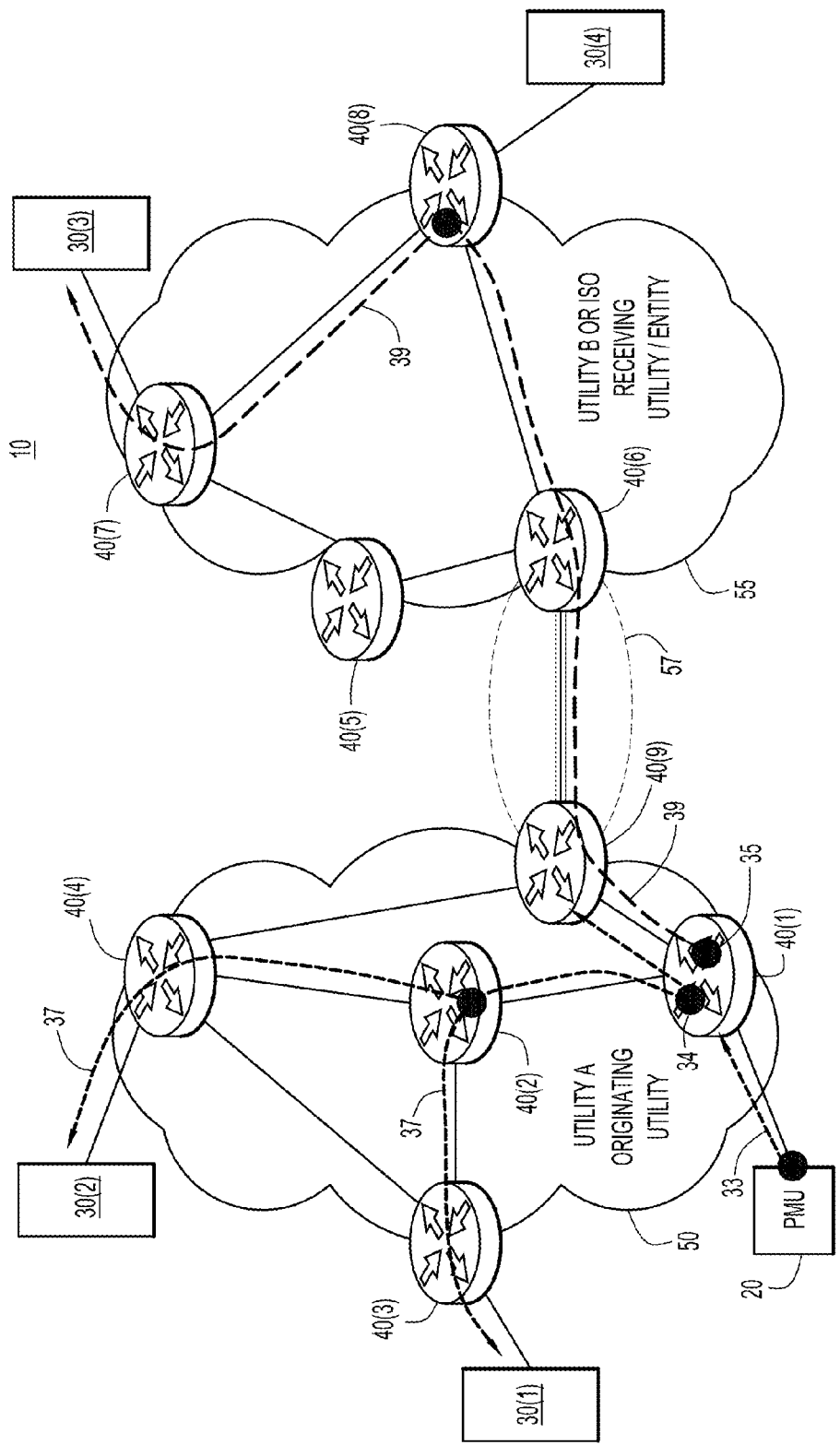
FIG. 5 is a diagram similar to FIGS. 1, 2 and 4, and showing how a network device selectively modifies phasor measurement data packets.

FIG. 5 is similar to FIG. 4, but also illustrates the masking operations that may be implemented on a router, e.g., router 40(1), when sending PMU data across a network domain. That is, the PMU data that originates from a PMU source, e.g., PMU 20, may be modified at the router 40(1), particularly when it is to cross a network domain from one Utility to another or from a Utility to an ISO utilities may not wish to (and may not be legally obligated to) share all of the PMU data available to them in a particular PMU data signal. For example, router 40(1), in executing the conversion process logic 100 referred to in connection with FIG. 3, may perform PMU packet modification and re-origination on the packets. Alternatively, router 40(9) may perform the PMU packet modification and re-origination.

In this example, router 40(1) receives from the PMU source 20 an IP unicast PMU data stream 33, e.g., in accordance with IEC 61850-90-5 or IEEE C37.118. For destinations that are to receive the stream un-modified, e.g., for PMU data consumers 30(1) and 30(2) that are part of the network 50, at 34, the router 40(1) converts the IP unicast PMU data stream to a multicast stream 37 and sends the IP packets, unmodified, into the network for distribution according to the multicast tree.

On the other hand, for one or more destinations that are not to receive all of the original PMU data, e.g., destinations outside the network 50, at 35, the router 40(1) (or router 40(9)) is configured to modify the PMU data packets, e.g., by masking certain fields in the packet before sending it out to the destination device, e.g., PMU data consumer 30(3). The PMU data consumer 30(3) receives the modified PMU data stream shown at reference numeral 39.

Figure 6:
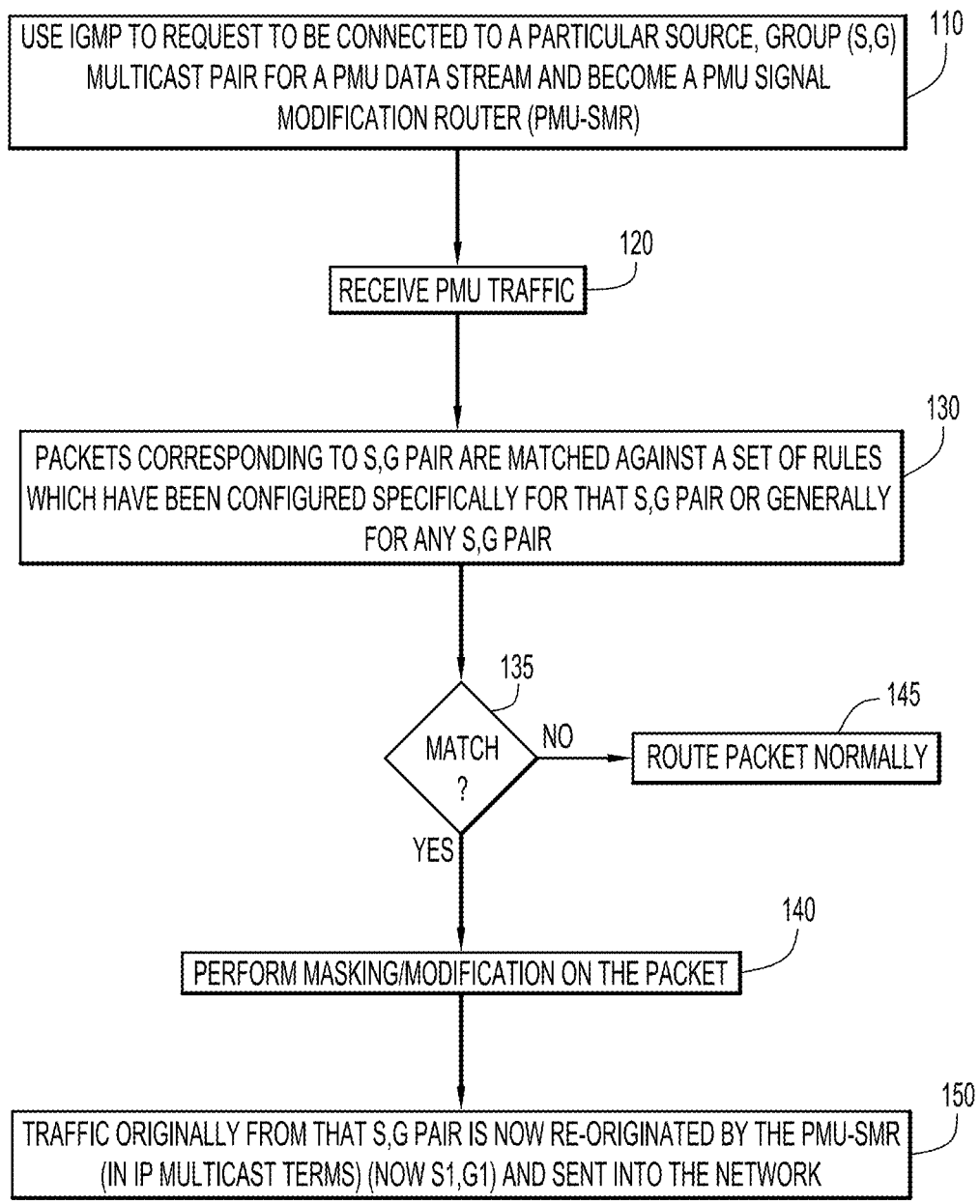
FIG. 6 is a flow chart illustrating operations performed by the network to selectively modify phasor measurement data packets in a multicast stream.

Reference is now made to FIG. 6 for a description of the operations of the conversion process logic 100. The description of FIG. 6 is made also with reference to FIG. 5. At 110, a particular router in the originating utility network, acting as a "proxy receiver" for PMU signaling data which will be transmitted out of the originating network (most likely, but not necessarily a border gateway router), uses IGMP to request to be connected to a particular Source, Group (S,G) multicast pair (corresponding to a particular PMU signal being originated within the local network). This router will become a PMU Signal Modification Router (PMU-SMR), and a receiver of the particular traffic identified by the S,G pair. Examples of potential PMU-SMR routers for source PMU (20) shown in FIG. 5, could routers 40(1), 40(2), or 40(9).

At 120, the PMU-SMR receives IEC 61850-90-5 or IEEE C37.118 PMU data traffic as a result of operation 110. As part of the configuration process of the PMU-SMR, it has been informed as to which S,G data it will proxy for. It will receive data corresponding to the particular S,G pair because it informed the network about the particular traffic it wanted to receive using IGMP. The PMU-SMR is now ready to process the traffic.

At 130, packets corresponding to S,G pair are matched against a set of stored handling rules which have been configured specifically for that S,G pair or more generally for any S,G pair that is processed in the PMU-SMR.

If it is determined at 135 that a match occurs, then at 140, a specific modification operation (e.g., masking/blanking or changing of data elements in the payload field) is performed on the packet. For example, data values in the packet payload are replaced with new values or they are removed or blanked out. The PMU-SMR will not request PMU data corresponding to a particular S,G unless it intends to perform modifications to the data or at a minimum, proxy (and thus re-originate the data using a new S,G pair). Modification of PMU (i.e., payload) data is typically done for PMU data traffic which is departing the originating utility's network. However, there may be reasons in which the originating utility wishes to modify PMU data for use within its own network. There is nothing to preclude the use of this methodology for data which is consumed within the originating utility also.

At 150, the traffic originally from that S,G pair is now re-originated by the PMU-SMR (in IP Multicast terms) with a new multicast S,G pair, (e.g., "S1,G1") and sent into the network. This is done because this new S1,G1 pair can be used as an alternative to the original S,G pair which the source of that PMU data (e.g., a Power Utility) does not wish to expose to the outside world. The receivers of the modified PMU packets with the pair S1,G1 will receive the PMU packets that are not identical to the original PMU packets. For example, some payload values will be modified, removed or blanked out.

If any IP unicast-to-multicast conversion takes place it is most-likely done at the FHR facing the PMU source, however, it could be done anywhere in the network. The router where the unicast-to-multicast conversion takes place then becomes the new source of the data from an IP multicast point of view. Unicast-to-multicast conversion is useful in cases where a utility wishes to use multicast as the transport for its PMU traffic and implements PMUs which do not output multicast formatted PMU signaling.

To summarize the process of FIG. 6, the PMU-SMR specifies that it wants to receive traffic for a particular (S,G) pair. The traffic for that S,G pair is compared/matched against stored pre-configured rules and one of two actions are taken: (A) specific data elements (IEC 61850-90-5 or IEEE C37-118 elements) in the PMU payload are blanked or (B) specific data elements are changed (e.g., replaced with alternate, pre-specified or computed values). The S,G pair information is replaced with the new S1,G1 pair information. The PMU-SMR re-originates the traffic for the new S1,G1 pair into the network. These "new" values, S1,G1 are the multicast information that is published externally to the originating utility. The ultimate receiver of the PMU signal data, most likely residing in an external Utility or RSO/ISO, will request to receive data for S1,G1. This data will be the modified or masked data from the PMU-SMR proxy.

Figure 7:
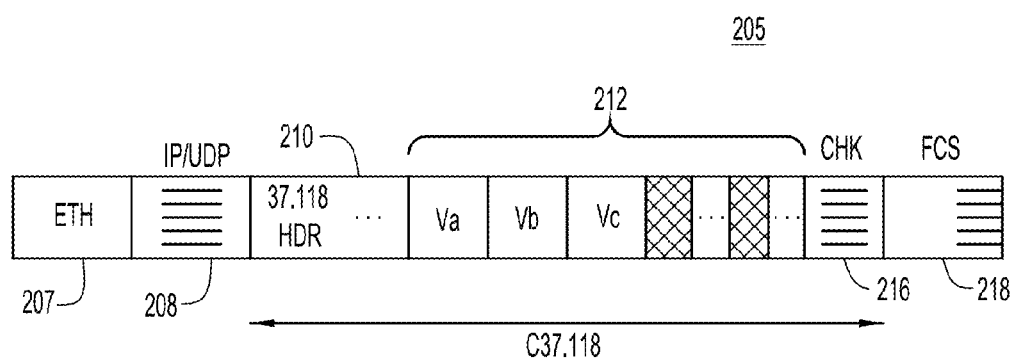
FIG. 7 is a diagram showing an example of modifications to a phasor measurement data packet.

FIG. 7 illustrates an example of how content of PMU data packet may be modified/masked for the scenario described above in connection with FIG. 6. The PMU data packet 205 comprises an Ethernet header 207, an IP or UDP header 208, and then several fields 210, 212, and 216 that are part of a IEEE C37.118 packet. Field 210 is the C37.118 header. Fields 212 are voltage phasors, current phasors and other relevant PMU signal data, produced by the PMU source, field 216 is a PMU signal Checksum field and field 218 contains a Ethernet Frame Check Sequence (FCS). In one example, in order to facilitate the re-origination of the PMU signal from the PMU-SMR, IP Source Address, IP destination address and UDP Checksum in field 208 are modified (this is done in order to be able to re-originate the packet with the modified data using new S,G values. The UDP Checksum, if used, must be recomputed since the IP addressing values have been changed). Also, the field 212 that is allocated to contain the phasor measurement data may be completed masked, or modified, or the phasor measurement data modified in some manner to reveal only certain aspects of the original phasor measurement data. Moreover, the Checksum in field 216 is recalculated to correspond to the data fields which were modified in the PMU signal payload in the IP/UDP packet (the Ethernet FCS in field 218 is recalculated at every hop in the network by the OSI Layer 2 process on a normal basis). Similar modifications may be applied to PMU data sent according to IEC 61850-90-5.

Masking of the PMU data payload information may be performed for different privilege levels, so that there can different sets of Receivers which have different privilege levels and receive only the PMU information appropriate to their level. The privilege levels are implemented/represented through the S,G information that is allowed to be disseminated to external (or internal receivers—with respect to the originating utility). The PMU data can be masked/modified based on destination Utility (internal or external) or other external entities (e.g., RSO/ISO) or for any other purpose. The originating utility may devise its own receiver/consumer identification scheme and then associate the relevant "visible" S,G values to each receiver type identified, e.g., they may simply assume that any PMU signal data leaving their network is to be treated with the same filter and therefore only requires a single S,G pair to support the policy. This S,G pair is then made public to all external entities which then use it to collect PMU signal data.

A different S,G pair may be used for a different modified version of the original PMU signal data stream. For example, a first modified version may be assigned to/sent on the pair $S_1,G_1$; a second modified version may be assigned to and sent on the pair $S_2,G_2$; a third modified version may be assigned to and sent on the pair $S_3,G_3$, and so on. The PMU-SMR for the original PMU signal data will re-originate each differently modified PMU data stream using a corresponding unique S,G pair. As explained above, a receiver may obtain information about an S,G pair for a particular modified PMU signal data stream from information supplied by the original PMU data stream owner, via email or other direct means, or obtaining that information from a registry that may be accessed by entities seeking access to a particular modified PMU data stream. In the case where there are multiple external receiving entities (e.g., Utilities or ISO/RSO), each of which requires a different modification of a single original PMU data signal, there is no guarantee that one external receiving entity will not try to utilize the S,G values that are intended for another external receiving entity. A separate enforcement mechanism such as encryption (whereby separate keys are given to different receiving entities) can be used to prevent access to the actual data should one external entity receive PMU data intended for a different receiver (through intentionally or non-intentionally, e.g., by requesting PMU data associated with another S,G pair that that which is intended for it).

To reiterate, when a PMU-SMR router receives a multicast data stream for modification, based on its S,G pair, it is likely also going to re-originate it with new S,G values (not always but likely most of the time). As a result, the group address will be changed to a new group address, the source address to a new address and so on. In unicast to multicast conversion, the destination and source address may also both be changed. The UDP checksum may also be changed if it is being implemented (i.e. if it is being computed). The UDP checksum field will still exist in the packet header even if the UDP checksum is not computed.

The above description is intended by way of example only.

What is claimed is:

1. A method comprising:
   at a network device, sending into a network a request to be connected to a particular multicast source-group pair for a phasor measurement data stream comprising packets containing phasor measurement data;
   receiving the phasor measurement data stream for the particular multicast source-group pair;
   comparing the source-group pair information against stored data specifying handling rules for packets associated with phasor measurement data streams;
   modifying the packets in the received phasor measurement data stream when there are handling rules in the stored data for the particular multicast source-group pair of the received phasor measurement data stream, wherein the modifying comprises modifying a payload field of the packets that contains phasor measurement data; and
   re-originating the packets for the phasor measurement data stream for the particular multicast source-group pair with a new multicast source-group pair and sending the packets back into the network.

2. The method of claim 1, wherein modifying comprises masking a portion of the payload field that contains the phasor measurement data.

3. The method of claim 1, wherein modifying comprises changing data elements in the payload field that contains the phasor measurement data.

4. The method of claim 1, and further comprising storing in the network device the data specifying handling rules for packets associated with phasor measurement data streams, wherein the handling rules specify different modified versions of the phasor measurement data stream, and wherein re-originating comprises re-originating each modified version of the phasor measurement data stream with a corresponding different new multicast source-group pair.

5. The method of claim 4, wherein modifying comprises modifying the packets in a manner that depends on the multicast source-group pair of the phasor measurement data stream based on the handling rules.

6. The method of claim 1, wherein receiving further comprises receiving the phasor measurement data stream as unicast packets, and further comprising converting the unicast packets to multicast packets, and wherein comparing and modifying are performed on the multicast packets converted from the received unicast packets.

7. The method of claim 1, wherein receiving comprises receiving packets formatted according to the IEEE C37.118 standard.

8. The method of claim 1, wherein receiving comprises receiving packets formatted according to the IEC 61850-90-5 standard.

9. One or more computer non-transitory readable storage media encoded with software comprising computer executable instructions and when the software is executed operable to:
   at a network device, send into a network a request to be connected to a particular multicast source-group pair for a phasor measurement data stream comprising packets containing phasor measurement data;
   compare the source-group pair information against stored data specifying handling rules for packets associated with phasor measurement data streams received at the network device including a phasor measurement data stream for the particular multicast source-group pair;
   modify the packets in the received phasor measurement data stream when there are handling rules in the stored data for the particular multicast source-group pair by modifying a payload field of the packets that contains the phasor measurement data; and
   re-originate the packets for the phasor measurement data stream for the particular multicast source-group pair with a new multicast source-group pair and send the packets back into the network.

10. The computer readable storage media of claim 9, wherein the instructions that are operable to modify comprise instructions operable to mask a portion of the payload field that contains the phasor measurement data.

11. The computer readable storage media of claim 9, wherein the instructions that are operable to modify comprise instructions operable to change bits in the payload field that contains the phasor measurement data.

12. The computer readable storage media of claim 9, and further comprising instructions operable to store in the network device the data specifying handling rules for packets associated with phasor measurement data streams, wherein the handling rules specify different modified versions of the phasor measurement data stream, and wherein the instructions operable to re-originate comprise instructions operable to re-originate each modified version of the phasor measurement data stream with a corresponding different new multicast source-group pair.

13. The computer readable storage media of claim 9, wherein the instructions that are operable to modify comprise instructions operable to modify the packets in a manner that depends on the source-group pair of the phasor measurement data stream based on the handling rules.

14. An apparatus comprising:
   a plurality of ports configured to send packets to and receive packets from a network;
   a packet forwarding unit coupled to the plurality of ports and configure to route packets among the plurality of ports; and
   a processor coupled to the packet forwarding unit, the processor configured to:
      generate a request to be connected to a particular multicast source-group pair for a phasor measurement data stream comprising packets containing phasor measurement data, the request to be sent into the network;
      compare the source-group pair information against stored data specifying handling rules for packets associated with received phasor measurement data streams including a phasor measurement data stream for the particular multicast source-group pair;
      modify the packets in the received phasor measurement data stream when there are handling rules in the stored data for the particular multicast source-group pair by modifying a payload field of the packets that contains the phasor measurement data; and
      re-originate the packets for the particular phasor measurement data stream for the particular multicast source-group pair with a new multicast source-group pair to be sent back into the network.

15. The apparatus of claim 14, wherein the processor is configured to mask a portion of the payload field that contains the phasor measurement data.

16. The apparatus of claim 14, wherein the processor is configured to change bits in a payload field of the packets that contains the phasor measurement data.

17. The apparatus of claim 14, and further comprising a memory that is configured to store the data specifying handling rules for packets associated with phasor measurement data streams, wherein the handling rules specify different modified versions of the phasor measurement data stream, and wherein the processor is configured to re-originate each modified version of the phasor measurement data stream with a corresponding different new multicast source-group pair.

18. The apparatus of claim 14, wherein the processor is configured to modify the packets in a manner that depends on the source-group pair of the phasor measurement data stream based on the handling rules.

\* \* \* \* \*